(12) United States Patent
  Kim

(10) Patent No.: US 10,356,500 B2
(45) Date of Patent: Jul. 16, 2019

(54) ELECTRONIC DEVICE INCLUDING SPEAKER

(71) Applicant: Samsung Electronics Co., Ltd, Suwon-si (KR)

(72) Inventor: Ji Hyun Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/046,502

(22) Filed: Jul. 26, 2018

(65) Prior Publication Data

US 2019/0037293 A1  Jan. 31, 2019

(30) Foreign Application Priority Data

Jul. 26, 2017 (KR) .................. 10-2017-0094834

(51) Int. Cl.
  *H04R 1/02* (2006.01)
  *H04M 1/02* (2006.01)
(52) U.S. Cl.
  CPC ............ *H04R 1/025* (2013.01); *H04M 1/026* (2013.01); *H04R 2499/11* (2013.01); *H04R 2499/15* (2013.01)
(58) Field of Classification Search
  CPC ............. H04R 1/025; H04R 2499/111; H04R 2499/15; H04M 1/026
  See application file for complete search history.

(56) References Cited

U.S. PATENT DOCUMENTS 9,264,810 B2 * 2/2016 Gioscia .................. H04R 3/04
9,414,140 B2   8/2016 Wang et al.
9,639,123 B2 * 5/2017 Choi ..................... G06F 1/1656
9,660,684 B2   5/2017 Rayner
9,737,123 B2   8/2017 Wright et al.
2008/0248841 A1 10/2008 Foo et al.
(Continued)

FOREIGN PATENT DOCUMENTS

JP   2009-005043 A    1/2009
JP   2010-283451 A   12/2010
KR  10-2015-0082043 A  7/2015

OTHER PUBLICATIONS

ISA/KR, "International Search Report and Written Opinion of the International Searching Authority," International Application No. PCT/KR2018/008481, dated Nov. 6, 2018, 13 pages.

*Primary Examiner* — Andrew L Sniezek

(57) ABSTRACT

An electronic device is disclosed. The electronic device includes a housing, a display, at least one through-hole, a speaker module, and an internal structure. The housing includes a front plate, a rear plate, and a side member. The display and the speaker module are disposed between the front plate and the rear plate. The through-hole is formed through the front plate between a portion of the side member and the display. The speaker module includes an acoustic generation surface facing the front plate near the through-hole. The internal structure is disposed between the front plate and the acoustic generation surface. The internal structure and the acoustic generation surface form a space, acoustically connected to the through-hole. The internal structure includes a surface facing the acoustic generation surface. The surface of the internal structure includes a plurality of areas, each with a different clearance from the acoustic generation surface.

20 Claims, 11 Drawing Sheets

(56) References Cited

U.S. PATENT DOCUMENTS

| | | |
|---|---|---|
| 2014/0161293 A1 | 6/2014 | Wang et al. |
| 2014/0166390 A1* | 6/2014 | Center ............... H04R 1/02 181/199 |
| 2015/0219608 A1* | 8/2015 | Choi ............ G01N 33/0004 73/23.2 |
| 2018/0206354 A1* | 7/2018 | Yoon ............... H05K 5/065 |

* cited by examiner understanding# ELECTRONIC DEVICE INCLUDING SPEAKER

CROSS-REFERENCE TO RELATED APPLICATION AND CLAIM OF PRIORITY

This application is based on and claims priority under 35 U.S.C. § 119 to Korean Patent Application No. 10-2017-0094834 filed on Jul. 26, 2017 in the Korean Intellectual Property Office, the disclosure of which is incorporated by reference herein its entirety.

BACKGROUND

1. Field

The present disclosure relates to an electronic device including a speaker.

2. Description of Related Art

There has been an increase in the use of mobile electronic devices such as smartphones, tablet personal computers (PCs), and wearable devices. The electronic device may perform a variety of functions such as a call, wireless communication, video playback, or web search. The electronic device may include a speaker for outputting sounds generated in a process of performing the various functions.

The above information is presented as background information only to assist with an understanding of the present disclosure. No determination has been made, and no assertion is made, as to whether any of the above might be applicable as prior art with regard to the present disclosure.

SUMMARY

When moisture is introduced into the inside through a hole for an acoustic output, the moisture introduced into an internal space of the hole may interfere with an acoustic output of a speaker.

Recently, as a display area becomes wider, a location of a hole for an acoustic output has been moved to an edge area (an area adjacent to a side) of an electronic device. Thus, an internal space for acoustically connecting a speaker module (a speaker device) in the electronic device with the hole for the acoustic output may become longer. In this case, there may be a high possibility that an acoustic generation surface of a speaker will be blocked by moisture introduced into the internal space or the structure. An output acoustic signal may deteriorate in sound quality by the moisture.

Aspects of the present disclosure are to address at least the above-mentioned problems and/or disadvantages and to provide at least the advantages described below. Accordingly, an aspect of the present disclosure is to provide an electronic device for reducing the effect of moisture introduced from the outside on an acoustic output, through a protrusion structure formed on a surface where a speaker is received.

In accordance with an aspect of the present disclosure, an electronic device is provided. The electronic device may include a housing configured to include a front plate, a rear plate facing a direction opposite to the front plate, and a side member which surrounds a space between the front plate and the rear plate, a touch screen display configured to be disposed between the front plate and the rear plate, at least one through-hole configured to, when seen from the front plate, be formed through the front plate between a portion of the side member and the touch screen display, a speaker module configured to be disposed between the front plate and the rear plate and, when seen from the front plate, include an acoustic generation surface facing the front plate, near the through-hole, and an internal structure configured to be disposed between the front plate and the acoustic generation surface. The internal structure and the acoustic generation surface may form a space, acoustically connected to the through-hole, together. The internal structure may include a surface facing the acoustic generation surface. The surface of the internal structure may include a plurality of areas, each of which has a different clearance.

The electronic device according to various embodiments of the present disclosure may reduce a possibility that liquid material (e.g., moisture) introduced from the outside will interfere with outputting an acoustic signal by diversifying a shape of a surface where a speaker module is received. Thus, the electronic device may output an acoustic signal of a specified level or more through the speaker module.

The electronic device according to various embodiments of the present disclosure may allow moisture introduced from the outside not to block an acoustic output surface, through a protrusion structure formed on the surface where the speaker module is received.

Other aspects, advantages, and salient features of the disclosure will become apparent to those skilled in the art from the following detailed description, which, taken in conjunction with the annexed drawings, discloses various embodiments of the present disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
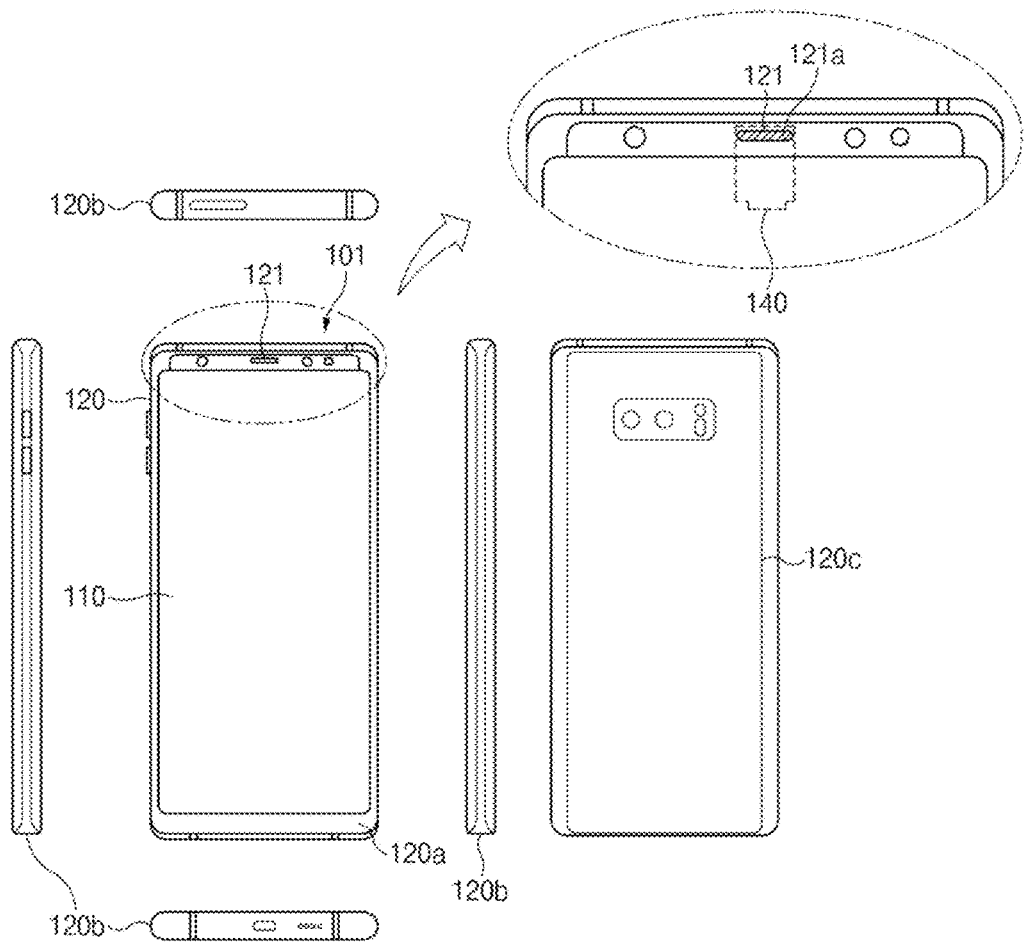
FIG. 1 illustrates an electronic device including a speaker according to various embodiments of the present disclosure.

FIGS. 1 through 8, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, various embodiments of the present disclosure will be described with reference to the accompanying drawings. Accordingly, those of ordinary skill in the art will recognize that modification, equivalent, and/or alternative on the various embodiments described herein can be variously made without departing from the scope and spirit of the present disclosure. With regard to description of drawings, similar components may be marked by similar reference numerals.

In the disclosure disclosed herein, the expressions "have", "may have", "include" and "comprise", or "may include" and "may comprise" used herein indicate existence of corresponding features (for example, elements such as numeric values, functions, operations, or components) but do not exclude presence of additional features.

In the disclosure disclosed herein, the expressions "A or B", "at least one of A or/and B", or "one or more of A or/and B", and the like used herein may include any and all combinations of one or more of the associated listed items. For example, the term "A or B", "at least one of A and B", or "at least one of A or B" may refer to all of the case (1) where at least one A is included, the case (2) where at least one B is included, or the case (3) where both of at least one A and at least one B are included.

The terms, such as "first", "second", and the like used herein may refer to various elements of various embodiments of the present disclosure, but do not limit the elements. For example, such terms are used only to distinguish an element from another element and do not limit the order and/or priority of the elements. For example, a first user device and a second user device may represent different user devices irrespective of sequence or importance. For example, without departing the scope of the present disclosure, a first element may be referred to as a second element, and similarly, a second element may be referred to as a first element.

It will be understood that when an element (for example, a first element) is referred to as being "(operatively or communicatively) coupled with/to" or "connected to" another element (for example, a second element), it can be directly coupled with/to or connected to the other element or an intervening element (for example, a third element) may be present. In contrast, when an element (for example, a first element) is referred to as being "directly coupled with/to" or "directly connected to" another element (for example, a second element), it should be understood that there are no intervening element (for example, a third element).

According to the situation, the expression "configured to" used herein may be used as, for example, the expression "suitable for", "having the capacity to", "designed to", "adapted to", "made to", or "capable of". The term "configured to (or set to)" must not mean only "specifically designed to" in hardware. Instead, the expression "a device configured to" may mean that the device is "capable of" operating together with another device or other components. CPU, for example, a "processor configured to (or set to) perform A, B, and C" may mean a dedicated processor (for example, an embedded processor) for performing a corresponding operation or a generic-purpose processor (for example, a central processing unit (CPU) or an application processor) which may perform corresponding operations by executing one or more software programs which are stored in a memory device.

Terms used in this specification are used to describe specified embodiments of the present disclosure and are not intended to limit the scope of the present disclosure. The terms of a singular form may include plural forms unless otherwise specified. Unless otherwise defined herein, all the terms used herein, which include technical or scientific terms, may have the same meaning that is generally understood by a person skilled in the art. It will be further understood that terms, which are defined in a dictionary and commonly used, should also be interpreted as is customary in the relevant related art and not in an idealized or overly formal detect unless expressly so defined herein in various embodiments of the present disclosure. In some examples, even if terms are terms which are defined in the specification, they may not be interpreted to exclude embodiments of the present disclosure.

An electronic device according to various embodiments of the present disclosure may include at least one of smartphones, tablet personal computers (PCs), mobile phones, video telephones, electronic book readers, desktop PCs, laptop PCs, netbook computers, workstations, servers, personal digital assistants (PDAs), portable multimedia players (PMPs), MP3 players, mobile medical devices, cameras, and wearable devices. According to various embodiments of the present disclosure, the wearable devices may include accessories (for example, watches, rings, bracelets, ankle bracelets, glasses, contact lenses, or head-mounted devices (HMDs)), cloth-integrated types (for example, electronic clothes), body-attached types (for example, skin pads or tattoos), or implantable types (for example, implantable circuits).

Hereinafter, electronic devices according to an embodiment of the present disclosure will be described with reference to the accompanying drawings. The term "user" used herein may refer to a person who uses an electronic device or may refer to a device (for example, an artificial electronic device) that uses an electronic device.

FIG. 1 illustrates an electronic device including a speaker according to various embodiments of the present disclosure.

Referring to FIG. 1, an electronic device 101 may include a display (or a display module) 110 and a housing (or a body part) 120.

The display 110 may include, for example, a liquid crystal display (LCD), a light-emitting diode (LED) display, an organic LED (OLED) display, a microelectromechanical systems (MEMS) display, or an electronic paper display. The display 110 may display, for example, a variety of content (e.g., a text, an image, a video, an icon, a symbol, and/or the like). The display 110 may include a touch screen and may receive, for example, a touch, a gesture, proximity, or a hovering input using an electronic pen or a portion of a user's body.

According to various embodiments, the display 110 may be disposed to occupy most of a front plate 120a mounted on a front surface of the electronic device 101 (a surface on which content is output through the display 110). For another example, the display 110 may have a form to be expanded to a side member (e.g., left and right sides) of the electronic device 101.

According to various embodiments, the display 110 may include an active area and a non-active area. The active area may be an area which outputs light and displays a text image or the like. The non-active area may be an area in which a wire, a circuit, or the like for operating the active area is disposed. The non-active area may be processed in, for example, a black color or may be hidden by a portion (e.g., a bezel) of the housing 120.

According to various embodiments, various physical elements (e.g., an acoustic output part 121, a camera lens, a sensor window, or the like) may be disposed around the periphery of the display 110. The physical elements may be disposed in a bezel area around the periphery of the display 110 or may be disposed in the form of overlapping with the non-active area of the display 110.

According to various embodiments, the housing 120 may include a front plate 120a on which the display 110 is mounted, a rear plate (or a back cover) 120c facing a direction opposite to the front plate 120a, and a side member 120b which surrounds a space between the front plate 120a and the rear plate 120c. The housing 120 may mount the display 110 and may include various elements (e.g., a processor, a communication circuit, a battery, a board, or the like) for driving the electronic device 101.

According to various embodiments, the electronic device 101 may include a speaker module 140 (or a speaker device or an acoustic generation device). The speaker module 140 may generate an acoustic signal by an electrical signal. The acoustic signal may be emitted to the outside via an acoustic output part 121 (e.g., a hole for an acoustic output).

According to various embodiments, the speaker module 140 may be disposed in the form of overlapping at least in part with the display 110. For example, when seen from the front plate 120a, the speaker module 140 may be disposed to overlap at least in part with the active area of the display 110.

Hereinafter, an embodiment is exemplified as the speaker module 140 is a call receiver. However, embodiments are not limited thereto.

According to various embodiments, the housing 120 may include the acoustic output part 121 (or a through-hole or an opening). The acoustic output part 121 may emit an acoustic signal (e.g., a ring-back tone, a music playback sound, or a call sound), output from the speaker module 140, to the outside. For example, the acoustic output part 121 may be disposed in an edge area of the front plate 120a of the housing 120. For example, the acoustic output part 121 may be disposed at a point adjacent to the side member 120b (e.g., an upper side member) to expand an area of the display 110.

According to various embodiments, the acoustic output part 121 may be an opening formed in the front plate 120a of the electronic device 101 (e.g., a surface where the display 110 is mainly disposed). The acoustic output part 121 may be disposed in a bezel area around the periphery of the display 110 or may be disposed to overlap with the non-active area of the display 110. For another example, the acoustic output part 121 may be formed though a portion of the active area of the display 110 or may be formed by cutting an outer portion of the active area.

According to various embodiments, the acoustic output part 121 may be hidden by a separate blocking member 121a (e.g., a mesh network). The blocking member 121a may primarily block, for example, foreign substances (e.g., dust, moisture, or the like) introduced into the acoustic output part 121.

According to various embodiments, in a process where a user uses the electronic device 101, when predetermined hydraulic pressure (e.g., hydrodynamic pressure or hydrostatic pressure) is supplied from the outside, liquid material (e.g., moisture) may be introduced into the electronic device 101 through the acoustic output part 121. For example, when the user wears the electronic device 101 (e.g., a smart watch) on his or her body and swims in the water, hydraulic pressure (e.g., hydrodynamic pressure) by water which flows in the electronic device 101 may act along motion of the user. Thus, moisture may be introduced through the acoustic output part 121 which is an area opened for an acoustic output of the electronic device 101. For another example, when the user wears the electronic device 101 (e.g., the smart watch) on his or her body and dives into water, hydraulic pressure (e.g., hydrostatic pressure) of increasing in proportion to a depth of water (e.g., hydraulic pressure of increasing 1 atmosphere per 10.1 m which is the depth of water) may act on the electronic device 101. Thus, moisture may be introduced through the acoustic output part 121 which is the area opened for an acoustic output of the electronic device 101.

According to various embodiments, the electronic device 101 may include an internal structure (e.g., a receiving part) which receives the speaker module 140. A surface of the internal structure, which faces an acoustic generation surface of the speaker module 140, among supporting members of the electronic device 101, may include a plurality of areas, each of which has a different clearance from the acoustic generation surface of the speaker module 140. For example, a central area of the surface of the internal structure may have a form protruded in a direction facing the speaker module 140. The surface of the internal structure of a curved form may separate liquid material (e.g., moisture) introduced through the acoustic output part 121. An acoustic signal may be effectively emitted to the outside in a state where liquid material is introduced into the periphery of the acoustic generation surface of the speaker module 140, through the surface of the internal structure of the curved form. Additional information about a structure of the internal structure may be provided with reference to FIGS. 3A to 6B. Hereinafter, an embodiment is exemplified as moisture is introduced through the acoustic output part 121. However, embodiments are not limited thereto.

Figure 2:
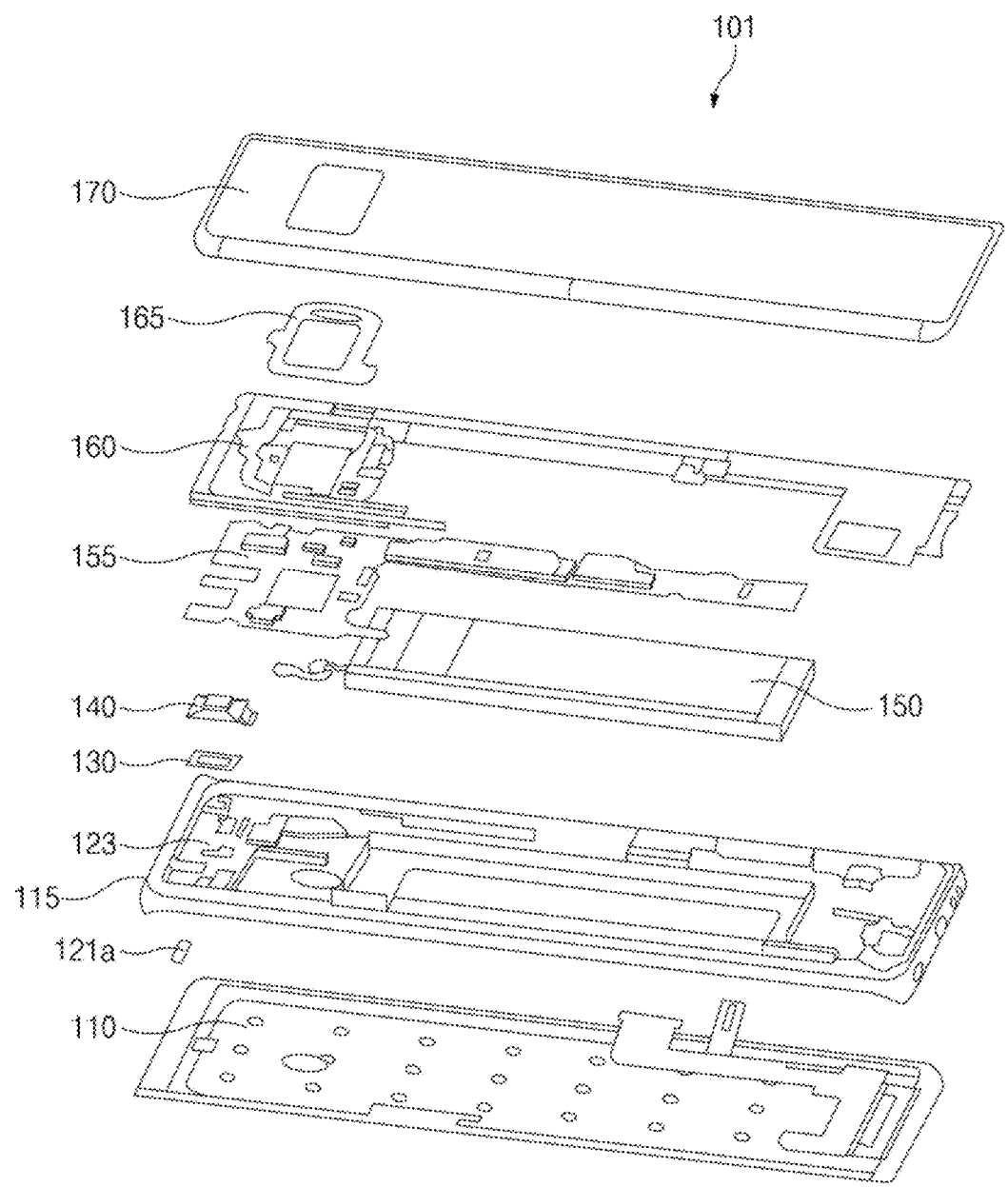
FIG. 2 illustrates an exploded perspective view of an electronic device according to various embodiments of the present disclosure.

FIG. 2 illustrates an exploded perspective view of an electronic device according to various embodiments of the present disclosure.

Referring to FIG. 2, an electronic device 101 may include a display 110 (e.g., a front plate), a first supporting member 115, a blocking member 121a, a waterproof member (or a waterproof tape) 130, a speaker module 140, a battery 150, a board 155, a second supporting member 160, a rear camera module 165, and a rear plate 170 (e.g., a back cover).

According to various embodiments, the display 110 may display a variety of content (e.g., a text, an image, a video, an icon, a symbol, and/or the like). The display 110 may include a glass cover exposed to the outside and various internal layers (e.g., a touch panel, a display panel, a polarizing layer, a protective layer, or the like).

According to various embodiments, the display 110 may include an active area and a non-active area. The active area may be an area which outputs light and displays a text image or the like. The non-active area may be an area where a wire, a circuit, or the like for operating the active area is disposed.

According to various embodiments, the first supporting member 115 may fix the display 110 and a peripheral component (e.g., a button, a front camera, or the like). The first supporting member 115 may include a speaker module receiving part 123 (e.g., an internal structure) for receiving the speaker module 140. The first supporting member 115 may be formed in the form of being integrated or combined with, for example, a side member. The speaker module receiving part 123 may include, for example, a speaker module receiving surface (e.g., a surface of the internal structure) and a structure for fixing the speaker module 140.

According to various embodiments, the first supporting member 115 may include an acoustic output part (or a through-hole). The acoustic output part may be partially hidden by the blocking member 121a. The blocking member 121a may primarily block foreign substances (e.g., dust, moisture, or the like) introduced into the acoustic output part.

According to various embodiments, the waterproof member 130 may be disposed between the speaker module receiving part 123 and the speaker module 140. The waterproof member 130 may block moisture introduced into the speaker module 140. The waterproof member 130 may transmit an acoustic signal generated by the speaker module 140. The waterproof member 130 may be fixed through an adhesive material (e.g., a double-sided tape) at its edge region.

According to various embodiments, the speaker module 140 may generate an acoustic signal by an electrical signal. The speaker module 140 may output a ring-back tone, a playback sound, a called party's voice, or the like according to a voice call. The speaker module 140 may be fixed to the speaker module receiving part 123 of the first supporting member 115.

According to various embodiments, the battery 150 may store electrical energy for driving the electronic device 101. The board 155 may mount a chip, a circuit, and the like for driving the electronic device 101. The second supporting member 160 may fix the battery 150, the board 155, the rear camera module 165, or the like. The rear plate 170 may protect a rear surface of the electronic device 101.

Figure 3A:
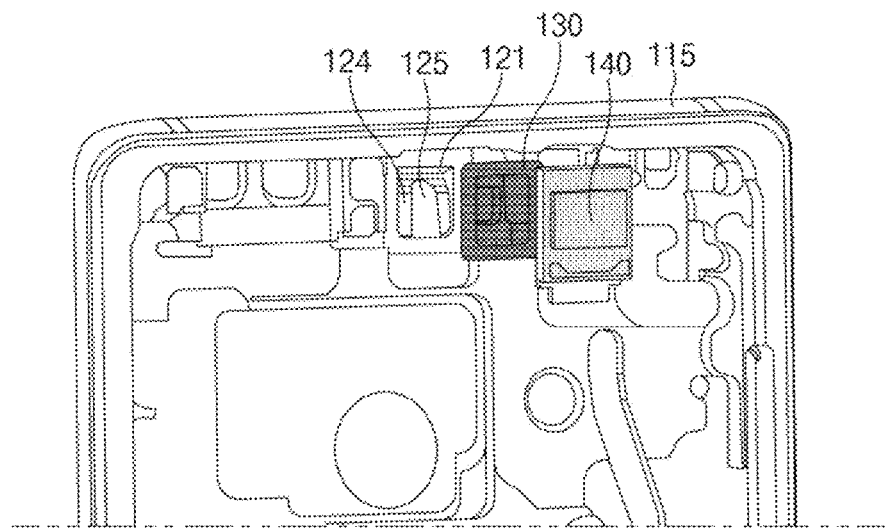
FIGS. 3A and 3B illustrates a process and location of where a speaker is mounted, according to various embodiments of the present disclosure.
Figure 3B:
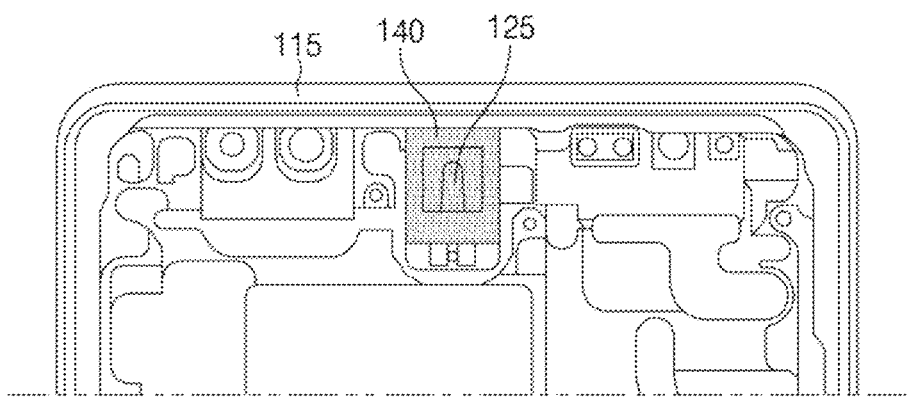

FIGS. 3A and 3B illustrate a process and location of where a speaker is mounted, according to various embodiments of the present disclosure.

Referring to FIGS. 3A and 3B, an acoustic output part 121 may be formed through a first supporting member 115. The acoustic output part 121 may emit an acoustic signal, output from a speaker module 140, to the outside.

According to various embodiments, the first supporting member 115 may include a rib 125 in a speaker module receiving surface 124 facing the speaker module 140. For example, the rib 125 may have, for example, a form protruded to the speaker module 140, in the speaker module receiving surface 124. Hereinafter, an embodiment is exemplified as the speaker module receiving surface 124 and the rib 125 are configured independently. However, embodiments are not limited thereto. According to an embodiment, the rib 125 may be a portion of the speaker module receiving surface 124. For example, the rib 125 may be an area protruded in a direction facing the speaker module 140 (or a waterproof member 130) in the speaker module receiving surface 124. The rib 125 may be integrally formed of the same material as the speaker module receiving surface 124 or may be formed of a material different from the speaker module receiving surface 124.

According to various embodiments, the rib 125 may be extended in a second direction (e.g., an up-and-down direction of an electronic device 101 of FIG. 2) perpendicular to an extending direction of the acoustic output part 121 (hereinafter referred to as "first direction") (e.g., a left-and-right direction of the electronic device 101). An upper portion of the rib 125 (e.g., a portion adjacent to the acoustic output part 121) may maintain a predetermined distance from the acoustic output part 121, which is capable of separating introduced moisture (see FIG. 4B), without being directly connected with the acoustic output part 121. The upper portion of the rib 125 may be rounded in, for example, a circular shape. A lower portion of the rib 125 (e.g., a portion facing a direction opposite to the acoustic output part 121) may be connected to the first supporting member 115. For example, the rib 125 may be integrally combined with the first supporting member 115. For another example, the rib 125 may be integrated with the first supporting member 115 with the same material as the first supporting member 115 or may be integrally combined with the first supporting member 115 with a material different from the first supporting member 115.

According to various embodiments, the lower portion of the rib 125 may have a wider width than the upper portion of the rib 125. A side of connecting the upper portion of the rib 125 with the lower portion of the rib 125 may be formed as an inclined plane. Additional information about a structure of the rib 125 may be provided with respect to FIGS. 4A and 4B.

According to various embodiments, the waterproof member 130 may be disposed between the speaker module 140 and the speaker module receiving surface 124 (or the rib 125). The waterproof member 130 may block moisture introduced into the speaker module 140 and may transmit an acoustic signal generated by the speaker module 140. The waterproof member 130 may include a waterproof film in its central area and may include an adhesive material (e.g., a double-sided tape) in its edge area.

According to various embodiments, the speaker module 140 may be fixed to the first supporting member 115 in a form where an acoustic generation surface (not shown) faces the speaker module receiving surface 124. The speaker module 140 may generate an acoustic signal by an electrical signal. According to an embodiment, a centerline of the second direction of the rib 125 (e.g., the up-and-down direction of the electronic device 101) may be identical to a centerline of the second direction of the speaker module 140 (e.g., the up-and-down direction of the electronic device 101).

According to an embodiment, the acoustic generation surface of the speaker module 140 may maintain a specified clearance (e.g., 0.2 mm) from the rib 125 without being in contact with the rib 125. While the introduction of moisture may be prevented through the clearance, an acoustic signal may be omitted to the outside.

Figure 4A:
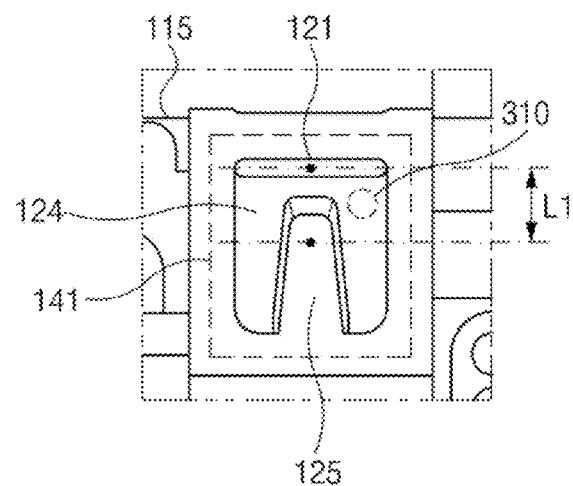
FIG. 4A illustrates an arrangement relationship between an acoustic output part and a speaker module according to various embodiments of the present disclosure.

FIG. 4A illustrates an arrangement relationship between an acoustic output part and a speaker module according to various embodiments of the present disclosure.

Referring to FIG. 4A, an acoustic output part 121 may be an opening formed through a first supporting member 115. The acoustic output part 121 may emit an acoustic signal, output from a speaker module, to the outside.

According to various embodiments, the center of the acoustic output part 121 may maintain a predetermined distance L1 from an acoustic generation surface 141 of the speaker module without being identical to the center of the acoustic generation surface 141 of the speaker module. As an active area of a display 110 of FIG. 2 increases, the acoustic output part 121 may be disposed at an edge area of an electronic device 101 of FIG. 2 (e.g., an area close to a side member of the electronic device 101). Thus, the distance L1 may gradually increase.

According to various embodiments, for a smooth acoustic output, an acoustic space 310 may be formed in the first supporting member 115. The acoustic space 310 may be a space surrounded by a speaker module receiving surface 124 and the acoustic generation surface 141. The acoustic space 310 may play a role as a path which delivers an acoustic signal, output from the acoustic generation surface 141, to the acoustic output part 121.

Liquid material (e.g., moisture) introduced from the outside may fill the acoustic space 310. When the liquid material (e.g., moisture) fills the acoustic space 310, it may interfere with emitting an acoustic signal from the acoustic generation surface 141. Thus, a user may fail to clearly listen to the acoustic signal. The rib 125 may separate liquid material (e.g., moisture) introduced from the outside. For example, the introduced liquid material (e.g., moisture) may move to the acoustic space 310 at the left and right of the rib 125 by characteristics (e.g., cohesion, adhesion, surface tension, or the like) of liquid material. An acoustic signal may be emitted to the acoustic output part 121 through a space between the rib 125 and the acoustic generation surface 141 and the acoustic space 310 which is not filled with moisture.

Figure 4B:
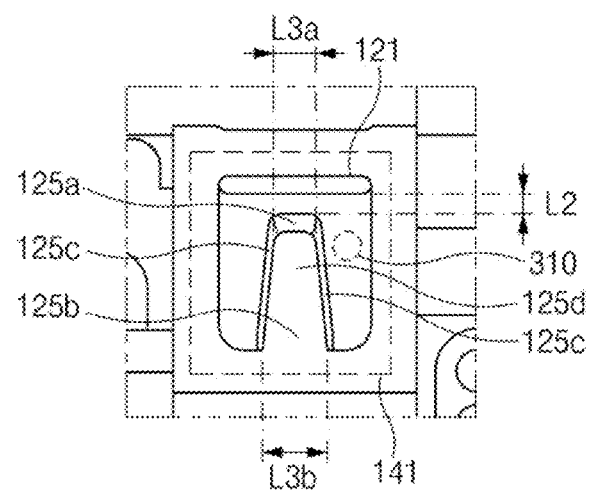
FIG. 4B illustrates a rib according to various embodiments of the present disclosure.

FIG. 4B illustrates a rib according to various embodiments of the present disclosure. FIG. 4B is, but is not limited to, an exemplary example.

Referring to FIG. 4B, a rib 125 of FIG. 4A according to various embodiments may be disposed in a central area of an acoustic space 310. The rib 125 may be integrally formed of the same material as a speaker module receiving surface 124 of FIG. 4A or may be formed of a material different from the speaker module receiving surface 124. In an embodiment, the rib 125 may be a portion where a central area of the speaker module receiving surface 124 is protruded in the direction of a speaker module 140 of FIG. 2.

According to various embodiments, an upper portion 125*a* of the rib 125 (e.g., a portion adjacent to an acoustic output part 121) may maintain a predetermined distance (e.g., about 0.8 mm) from the acoustic output part 121, which is capable of separating introduced moisture. The rib 125 may be extended in a second direction (e.g., an up-and-down direction of an electronic device 101 of FIG. 2) perpendicular to a first direction (e.g., a left-and-right direction of the electronic device 101). A lower portion 125*b* of the rib 125 may be connected to another portion of a first supporting member 115 of FIG. 4A.

According to various embodiments, a width L3*a* of the upper portion 125*a* may differ from a width L3*b* of the lower portion 125*b*. For example, the width L3*a* of the upper portion 125*a* may be smaller than the width L3*b* of the lower portion 125*b*. According to an embodiment, the width L3*b* of the lower portion 125*b* may be about ⅓ of a width of the acoustic generation surface 141 of the speaker module 140.

According to various embodiments, a side portion 125*c* of the rib 125 may be an area between the upper portion 125*a* and the lower portion 125*b*. The side portion 125*c* may have, for example, an inclined shape.

According to various embodiments, the upper portion 125*a* and the side portion 125*c* of the rib 125 may be rounded.

According to various embodiments, a speaker adjacent surface 125*d* of the rib 125, facing the acoustic generation surface 141, may be formed as a surface substantially parallel to the acoustic generation surface 141. The speaker adjacent surface 125*d* may maintain a specified clearance (e.g., about 0.2 mm) from the acoustic generation surface 141 without being in contact with the acoustic generation surface 141 of the speaker module 140.

According to an embodiment, a space between the speaker adjacent surface 125*d* and the speaker module 140 may be narrower than a space where the rib 125 is not disposed in the acoustic space 310. For example, the space between the speaker adjacent surface 125*d* and the speaker module 140 may be narrower than a left and right side space of the rib 125 (e.g., the acoustic space 310 adjacent to the side portion 125*c*) or an upper space of the rib 125 (e.g., the acoustic space 310 between the acoustic output part 121 and the upper portion 125*a*). Moisture introduced through the acoustic output part 121 may primarily fill the left and right side space of the rib 125 by cohesion or surface tension. Additional information about arrangement of the rib 125 and a shape of the acoustic space 310 may be provided with reference to FIGS. 6A and 6B.

Figure 5:
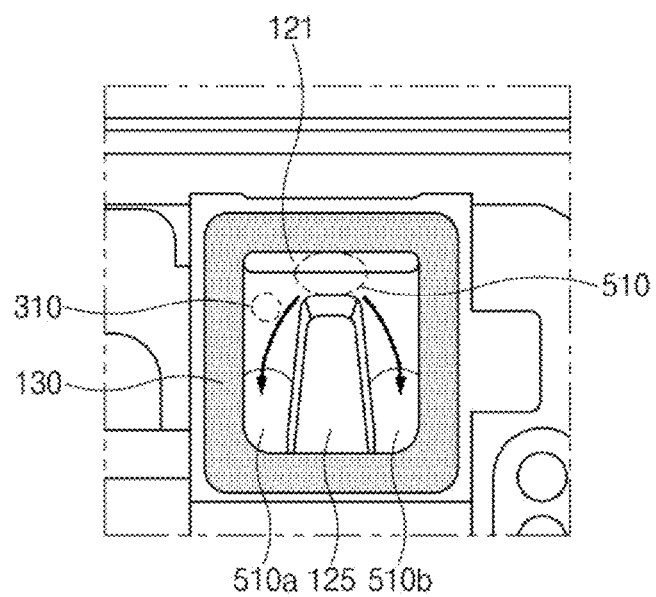
FIG. 5 illustrates the introduction of liquid material into an acoustic space according to various embodiments of the present disclosure.

FIG. 5 illustrates the introduction of liquid material into an acoustic space according to various embodiments of the present disclosure. FIG. 5 is, but is not limited to, an exemplary example.

Referring to FIG. 5, liquid material (e.g., moisture) 510 may be introduced into an acoustic space 310 through an acoustic output part 121. The introduced liquid material (e.g., moisture) 510 may be divided by a rib 125. The divided liquid material (e.g., moisture) 510*a* or 510*b* may be received in the acoustic space 310 at the left and right of the rib 125 by characteristics (e.g., cohesion, adhesion, surface tension, or the like) of liquid material.

Figure 6A:
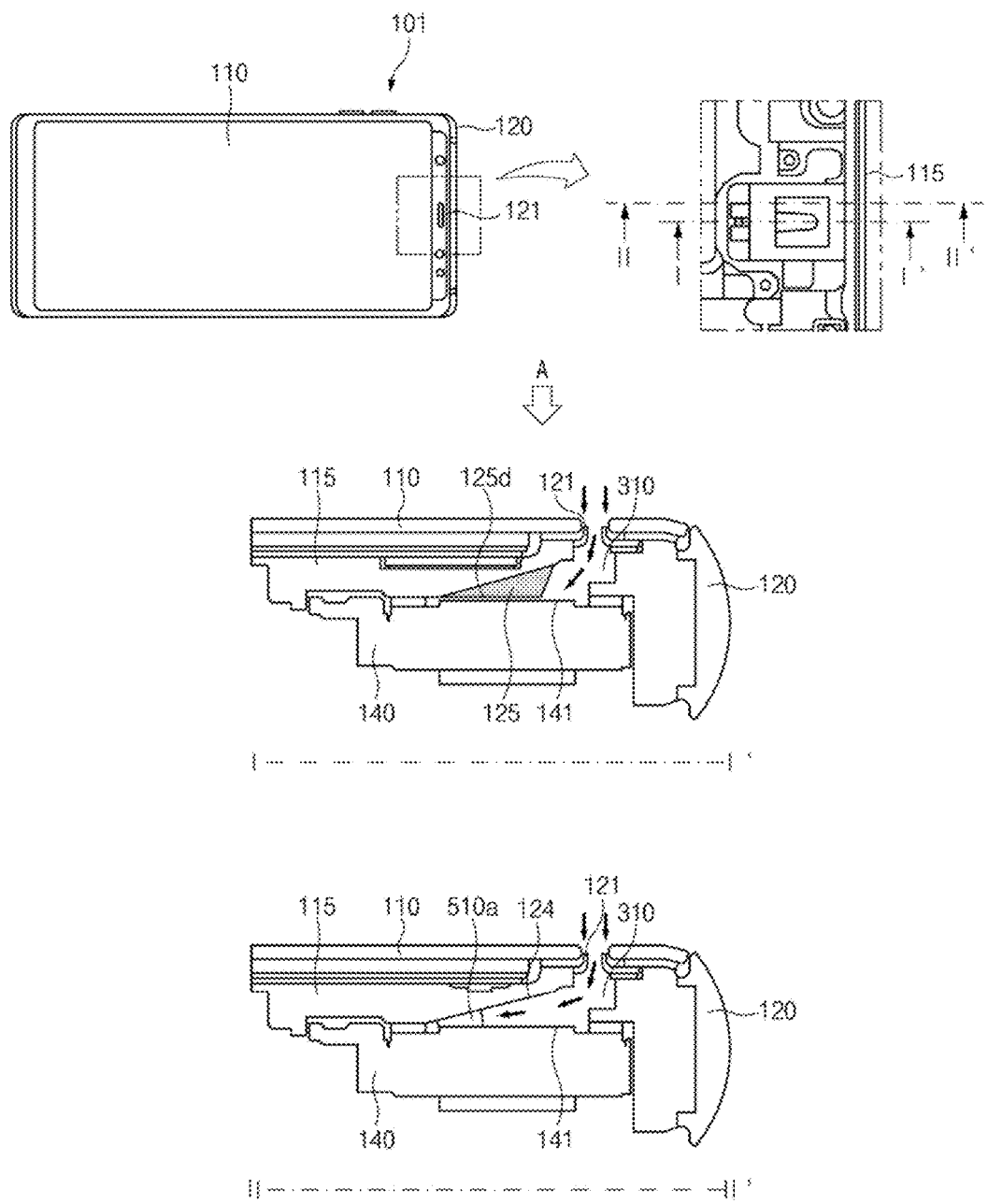
FIG. 6A illustrates a cross-sectional view of a direction (an up-and-down direction) of an electronic device according to various embodiments of the present disclosure.

According to various embodiments, as further away from the acoustic output part 121, the acoustic space 310 may decrease in volume (see FIG. 6A). The moister (such as a liquid material) 510*a* and 510*b* introduced into the acoustic space 310 may be received by moving in the direction of a lower end of the rib 125 (e.g., a direction away from the acoustic output part 121) by capillarity.

Liquid material may be relatively small in quantity by characteristics (e.g., cohesion, adhesion, surface tension, or the like) of introduced liquid material in a space between the rib 125 and an acoustic generation surface 141 of FIG. 4A and the acoustic space 310 adjacent to the acoustic output part 121. An acoustic signal generated by a speaker module 140 of FIG. 2 may be emitted to the outside through the space.

FIG. 6A illustrates a cross-sectional view of a direction (an up-and-down direction) of an electronic device according to various embodiments of the present disclosure. FIG. 6A is, but is not limited to, an exemplary example.

Referring to FIG. 6A, an acoustic output part 121 may be formed through a front plate of a housing 120. The acoustic output part 121 may emit an acoustic signal, output from a speaker module 140, to the outside. The acoustic output part 121 may be disposed adjacent to a side member (e.g., a side member 120*b* of FIG. 1) of the housing 120.

According to various embodiments, in a cross-sectional view (a cross-sectional view taken from direction I-I') of a second direction (e.g., an up-and-down direction of an electronic device 101) about a rib 125, the center of the acoustic output part 121 and the center of the speaker module 140 may fail to be identical to each other. For example, the center of the acoustic output part 121 may maintain a specified distance (e.g., a distance L1 of FIG. 4A) from the center of an acoustic generation surface 141 of the speaker module 140. When seen from the front plate (when seen from direction A), the speaker module 140 may be partially disposed to overlap with an active area of a display 110. An acoustic space 310 may guide an acoustic signal, output from the speaker module 140, to the acoustic output part 121.

According to various embodiments, the rib 125 may be disposed adjacent to the acoustic generation surface 141 of the speaker module 140. A speaker adjacent surface 125*d* of the rib 125 may be substantially parallel to the acoustic generation surface 141. The speaker adjacent surface 125*d* may maintain a specified distance (e.g., about 0.2 mm) from the acoustic generation surface 141 without being in contact with the acoustic generation surface 141. The introduction of moisture may be relatively reduced by characteristics (e.g., cohesion, adhesion, surface tension, or the like) of liquid material between the speaker adjacent surface 125*d* and the acoustic generation surface 141.

According to various embodiments, in a cross-sectional view (a cross-sectional view taken from direction II-II') of a second direction (e.g., an up-and-down direction of the electronic device 101) of the acoustic space 310, the rib 125 may fail to be included in the acoustic space 310. A speaker module receiving surface 124 may be formed as an inclined surface which gradually decreases in a distance from the acoustic generation surface 141 as further away from the acoustic output part 121. As further away from the acoustic output part 121, the acoustic space 310 may be gradually reduced through the inclined surface. Moisture 510*a* introduced from the outside may be received in a relatively narrow space in the acoustic space 310 (e.g., a space relatively away from the acoustic output part 121) by characteristics (e.g., cohesion or adhesion) of introduced liquid material. An acoustic signal may be omitted through the rest which is not filled with the moisture 510*a* in the acoustic space 310.

Figure 6B:
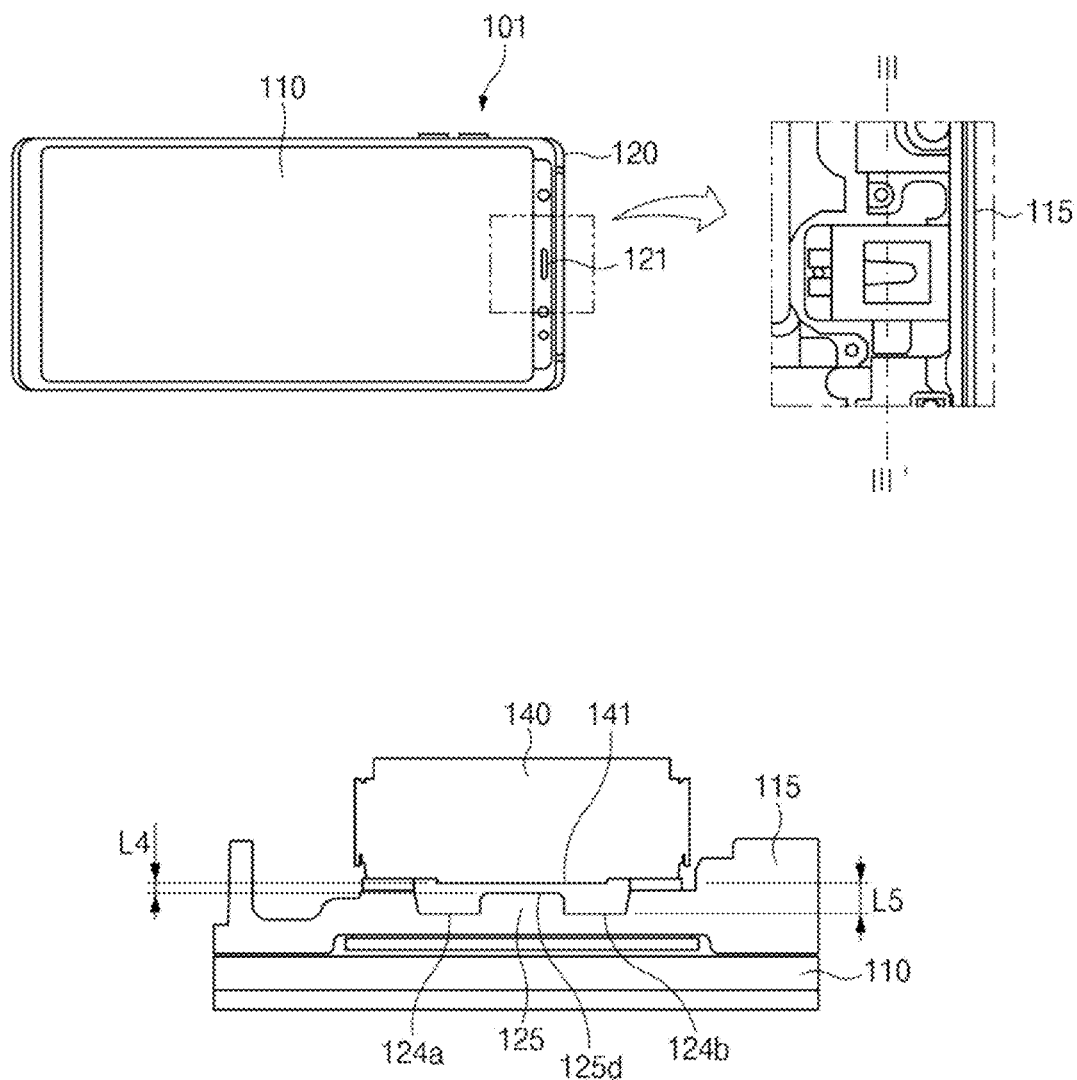
FIG. 6B illustrates a cross-sectional view of a direction (a left-and-right direction) of an electronic device according to various embodiments of the present disclosure.

FIG. 6B illustrates a cross-sectional view of a direction (a left-and-right direction) of an electronic device according to various embodiments of the present disclosure. FIG. 6B is, but is not limited to, an exemplary example.

Referring to FIG. 6B, in a cross-sectional view (a cross-sectional view taken from direction III-III') of a first direction (e.g., a left-and-right direction of an electronic device 101) about a rib 125, a speaker adjacent surface 125*d* of the rib 125 (or a first area of a speaker module receiving surface 124 of FIG. 6A) may maintain a first distance L4 from an acoustic generation surface 141. The speaker adjacent surface 125*d* may be a surface substantially parallel to the acoustic generation surface 141.

According to various embodiments, an area except for an area where the rib 125 is disposed (or a second area 124*a* and a third area 124*b* of the speaker module receiving surface 124) may maintain a second distance L5 from the acoustic generation surface 141. Each of the second area 124*a* and the third area 124*b* may fail to be a surface parallel to the acoustic generation surface 141. For example, as further away from the acoustic output part 121, the second area 124*a* and the third area 124*b* may be closer to the acoustic generation surface 141.

Figure 7:
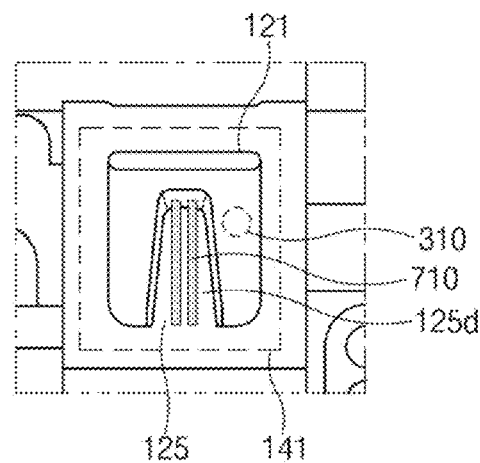
FIG. 7 illustrates a groove structure formed in a rib according to various embodiments of the present disclosure.

FIG. 7 illustrates a groove structure formed in a rib according to various embodiments of the present disclosure. In FIG. 7, an embodiment is exemplified as a direction, a width, and an extending direction of a groove 710. However, embodiments are not limited thereto.

Referring to FIG. 7, a rib 125 may include the at least one groove 710 on a speaker adjacent surface 125*d*. The groove 710 may function as a path capable of moving moisture between the speaker adjacent surface 125*d* and an acoustic generation surface 141. For example, the groove 710 may be extended in a direction facing an acoustic output part 121.

The groove 710 may allow moisture introduced between the speaker adjacent surface 125*d* and the acoustic generation surface 141 to easily move to a space around the periphery of the rib 125. For example, when moisture is introduced through the acoustic output part 121, it may be received in at least a portion of the groove 710. When an acoustic signal is generated by a speaker module, moisture may be expelled in a direction facing the acoustic output part 121 along the groove 710 by a wave generated by the acoustic signal.

According to an embodiment, the groove 710 may be inclined in a direction facing the acoustic output part 121 or may have an opened shape. For example, the groove 710 may include an inclined surface formed towards the acoustic output part 121. In this example, moisture may easily move along the inclined surface of the groove 710, and the obstruction of an output of an acoustic signal due to moisture may be reduced.

According to various embodiments, an electronic device (e.g., the electronic device 101 of FIG. 1) includes a housing configured to include a front plate, a rear plate facing a direction opposite to the front plate, and a side member which surrounds a space between the front plate and the rear plate, a touch screen display configured to be disposed between the front plate and the rear plate, at least one through-hole configured to, when seen from the front plate, be formed through the front plate between a portion of the side member and the touch screen display, a speaker module configured to be disposed between the front plate and the rear plate and, when seen from the front plate, include an acoustic generation surface facing the front plate, near the through-hole, and an internal structure configured to be disposed between the front plate and the acoustic generation surface, wherein the internal structure and the acoustic generation surface form a space, acoustically connected to the through-hole, together, wherein the internal structure comprises a surface facing the acoustic generation surface, and wherein the surface of the internal structure comprises a plurality of areas, each of which has a different clearance.

According to various embodiments, the acoustic generation surface is substantially flat, and the plurality of areas comprise a first area having a first clearance from the acoustic generation surface, and a second area having a second clearance greater than the first clearance from the acoustic generation surface.

According to various embodiments, the plurality of areas further comprise a third area having the second clearance from the acoustic generation surface, wherein, when seen from the front plate, the first area is disposed between the second area and the third area, and wherein the first to third areas are extended substantially parallel to each other in a direction facing the portion of the side member from the touch screen display.

According to various embodiments, the second clearance increases in the direction. The first area is substantially parallel to the acoustic generation surface.

According to various embodiments, when seen from the front plate, the acoustic generation surface overlaps at least in part with the touch screen display.

According to various embodiments, the internal structure is at least in part disposed between the touch screen display and the acoustic generation surface.

According to various embodiments, an electronic device includes a housing configured to include a front plate disposed to face a first direction, a rear plate facing a second direction opposite to the first direction, and a side member which surrounds a space between the front plate and the rear plate, a display configured to face the first direction and be disposed between the front plate and the rear plate, a supporting member configured to be disposed between the display and the rear plate, a speaker module configured to have an acoustic generation surface, capable of outputting an acoustic signal, facing the first direction, and a waterproof member configured to be disposed between a portion of the supporting member and the acoustic generation surface, wherein the front plate comprises a through-hole configured to face the first direction and be acoustically connected with the acoustic generation surface, wherein the supporting member comprises a speaker module receiving part configured to have a surface facing the speaker module in an area adjacent to the through-hole, the speaker module receiving part in which the speaker module is received, and wherein the surface of the speaker module receiving part comprises a rib protruded to the acoustic generation surface.

According to various embodiments, the rib is extended in a direction perpendicular to a direction where the through-hole is extended. As further away from the through-hole, the rib gradually increases in width. The rib has a surface substantially parallel to the acoustic generation surface. The rib is rounded in an edge portion adjacent to the acoustic generation surface.

According to various embodiments, as further away from the through-hole, the surface of the speaker module receiving module is closer to the acoustic generation surface. The rib is integrally formed of the same material as the speaker module receiving part.

According to various embodiments, an electronic device includes a housing configured to include a front plate disposed to face a first direction, a rear plate facing a direction opposite to the first direction, and a side member which surrounds a space between the front plate and the rear plate, a display configured to face the first direction and be disposed between the front plate and the rear plate, a supporting member configured to be disposed between the display and the rear plate, a speaker module configured to have an acoustic generation surface, capable of outputting an acoustic signal, facing the first direction, and a waterproof member configured to be disposed between a portion of the supporting member and the acoustic generation surface, wherein the front plate comprises a through-hole configured to face the first direction and be acoustically connected with the acoustic generation surface, wherein the supporting member comprises a speaker module receiving part configured to have a surface facing the speaker module in an area adjacent to the through-hole, the speaker module receiving part in which the speaker module is received, and wherein the surface of the speaker module receiving part comprises a plurality of areas, each of which has a different clearance from the acoustic generation surface.

According to various embodiments, the plurality of areas comprise a first area having a first clearance from the acoustic generation surface, and a second area having a second clearance greater than the first clearance from the acoustic generation surface. The first area is an area corresponding to the center of the acoustic generation surface. The first area is substantially parallel to the acoustic generation surface. As further away from the through-hole, the second area is closer to the acoustic generation surface.

According to various embodiments, the second area receives liquid material introduced through the through-hole.

Figure 8:
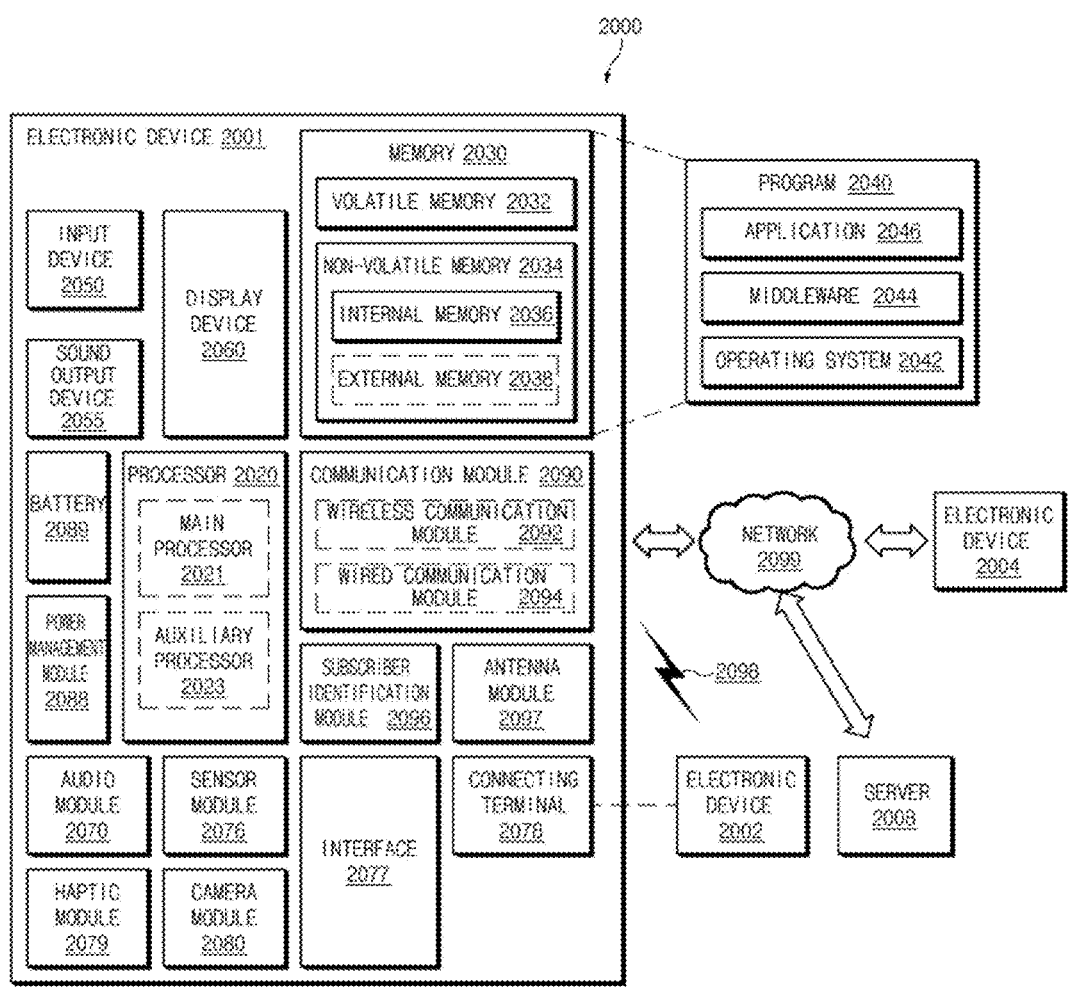
FIG. 8 illustrates a block diagram illustrating an electronic device in a network environment, according to various embodiments of the present disclosure.

FIG. 8 illustrates a block diagram of an electronic device (e.g., the electronic device 101 of FIG. 1) 2001 in a network environment 2000, according to various embodiments of the present disclosure. An electronic device according to various embodiments of this disclosure may include various forms of devices. For example, the electronic device may include at least one of, for example, portable communication devices (e.g., smartphones), computer devices (e.g., personal digital assistants (PDAs), tablet personal computers (PCs), laptop PCs, desktop PCs, workstations, or servers), portable multimedia devices (e.g., electronic book readers or Motion Picture Experts Group (MPEG-1 or MPEG-2) Audio Layer 3 (MP3) players), portable medical devices (e.g., heartbeat measuring devices, blood glucose monitoring devices, blood pressure measuring devices, and body temperature measuring devices), cameras, or wearable devices. The wearable device may include at least one of an accessory type (e.g., watches, rings, bracelets, anklets, necklaces, glasses, contact lens, or head-mounted-devices (HMDs)), a fabric or garment-integrated type (e.g., an electronic apparel), a body-attached type (e.g., a skin pad or tattoos), or a bio-implantable type (e.g., an implantable circuit). According to various embodiments, the electronic device may include at least one of, for example, televisions (TVs), digital versatile disk (DVD) players, audios, audio accessory devices (e.g., speakers, headphones, or headsets), refrigerators, air conditioners, cleaners, ovens, microwave ovens, washing machines, air cleaners, set-top boxes, home automation control panels, security control panels, game consoles, electronic dictionaries, electronic keys, camcorders, or electronic picture frames.

In another embodiment, the electronic device may include at least one of navigation devices, satellite navigation system (e.g., Global Navigation Satellite System (GNSS)), event data recorders (EDRs) (e.g., black box for a car, a ship, or a plane), vehicle infotainment devices (e.g., head-up display for vehicle), industrial or home robots, drones, automatic teller's machines (ATMs), points of sales (POSs), measuring instruments (e.g., water meters, electricity meters, or gas meters), or internet of things (e.g., light bulbs, sprinkler devices, fire alarms, thermostats, or street lamps). The electronic device according to an embodiment of this disclosure may not be limited to the above-described devices, and may provide functions of a plurality of devices like smartphones which has measurement function of personal biometric information (e.g., heart rate or blood glucose). In this disclosure, the term "user" may refer to a person who uses an electronic device or may refer to a device (e.g., an artificial intelligence electronic device) that uses the electronic device.

Referring to FIG. 9, under the network environment 2000, the electronic device 2001 (e.g., the electronic device 101) may communicate with an electronic device 2002 through local wireless communication 2098 or may communication with an electronic device 2004 or a server 2008 through a network 2099. According to an embodiment, the electronic device 2001 may communicate with the electronic device 2004 through the server 2008.

According to an embodiment, the electronic device 2001 may include a bus 2010, a processor 2020, a memory 2030, an input device 2050 (e.g., a micro-phone or a mouse), a display device 2060, an audio module 2070, a sensor module 2076, an interface 2077, a haptic module 2079, a camera module 2080, a power management module 2088, a battery 2089, a communication module 2090, and a subscriber identification module 2096. According to an embodiment, the electronic device 2001 may not include at least one (e.g., the display device 2060 or the camera module 2080) of the above-described elements or may further include other element(s).

The bus 2010 may interconnect the above-described elements 2020 to 2090 and may include a circuit for conveying signals (e.g., a control message or data) between the above-described elements. The processor 2020 may include one or more of a central processing unit (CPU), an application processor (AP), a graphic processing unit (GPU), an image signal processor (ISP) of a camera or a communication processor (CP). The processor 2020 may include a main processor 2021 and an auxiliary processor 2023. According to an embodiment, the processor 2020 may be implemented with a system on chip (SoC) or a system in package (SiP). For example, the processor 2020 may drive an operating system (OS) or an application to control at least one of another element (e.g., hardware or software element) connected to the processor 2020 and may process and compute various data. The processor 2020 may load a command or data, which is received from at least one of other elements (e.g., the communication module 2090), into a volatile memory 2032 to process the command or data and may store the result data into a nonvolatile memory 2034.

The memory 2030 may include, for example, the volatile memory 2032 or the nonvolatile memory 2034. The volatile memory 2032 may include, for example, a random access memory (RAM) (e.g., a dynamic RAM (DRAM), a static RAM (SRAM), or a synchronous DRAM (SDRAM)). The nonvolatile memory 2034 may include, for example, an one time programmable read-only memory (OTPROM), a programmable read-only memory (PROM), an erasable PROM (EPROM), an electrically EPROM (EEPROM), a mask ROM, a flash ROM, a flash memory, a hard disk drive (HDD), or a solid-state drive (SSD). In addition, the nonvolatile memory 2034 may be configured in the form of an internal memory 2036 or the form of an external memory 2038 which is available through connection only if necessary, according to the connection with the electronic device 2001. The external memory 2038 may further include a flash drive such as compact flash (CF), secure digital (SD), micro secure digital (Micro-SD), mini secure digital (Mini-SD), extreme digital (xD), a multimedia card (MMC), or a memory stick. The external memory 2038 may be operatively or physically connected with the electronic device 2001 in a wired manner (e.g., a cable or a universal serial bus (USB)) or a wireless (e.g., Bluetooth) manner.

For example, the memory 2030 may store, for example, at least one different software element, such as a command or data associated with the program 2040, of the electronic device 2001. The program 2040 may include, for example, operation system 2042, middleware 2044 or an application program (interchangeably, "application") 2046.

The input device 2050 may include a microphone, a mouse, or a keyboard. According to an embodiment, the keyboard may include a keyboard physically connected or a virtual keyboard displayed through the display device 2060.

The display device 2060 may include a display, a hologram device or a projector, and a control circuit to control a relevant device. The display may include, for example, a liquid crystal display (LCD), a light emitting diode (LED) display, an organic LED (OLED) display, a microelectromechanical systems (MEMS) display, or an electronic paper display. According to an embodiment, the display may be flexibly, transparently, or wearably implemented. The display may include a touch circuitry, which is able to detect a user's input such as a gesture input, a proximity input, or a hovering input or a pressure sensor (interchangeably, a force sensor) which is able to measure the intensity of the pressure by the touch. The touch circuit or the pressure sensor may be implemented integrally with the display or may be implemented with at least one sensor separately from the display. The hologram device may show a stereoscopic image in a space using interference of light. The projector may project light onto a screen to display an image. The screen may be located inside or outside the electronic device 2001.

The audio module 2070 may convert, for example, from a sound into an electrical signal or from an electrical signal into the sound. According to an embodiment, the audio module 2070 may acquire sound through the input device 2050 (e.g., a microphone) or may output sound through an output device (not illustrated) (e.g., a speaker or a receiver) included in the electronic device 2001, an external electronic device (e.g., the electronic device 2002 (e.g., a wireless speaker or a wireless headphone)) or an electronic device 2002 (e.g., a wired speaker or a wired headphone) connected with the electronic device 2001

The sensor module 2076 may measure or detect, for example, an internal operating state (e.g., power or temperature) of the electronic device 2001 or an external environment state (e.g., an altitude, a humidity, or brightness) to generate an electrical signal or a data value corresponding to the information of the measured state or the detected state. The sensor module 2076 may include, for example, at least one of a gesture sensor, a gyro sensor, a barometric pressure sensor, a magnetic sensor, an acceleration sensor, a grip sensor, a proximity sensor, a color sensor (e.g., a red, green, blue (RGB) sensor), an infrared sensor, a biometric sensor (e.g., an iris sensor, a fingerprint sensor, a heartbeat rate monitoring (FIRM) sensor, an e-nose sensor, an electromyography (EMG) sensor, an electroencephalogram (EEG) sensor, an electrocardiogram (ECG) sensor), a temperature sensor, a humidity sensor, an illuminance sensor, or an ultraviolet (UV) sensor. The sensor module 2076 may further include a control circuit for controlling at least one or more sensors included therein. According to an embodiment, the sensor module 2076 may be controlled by using the processor 2020 or a processor (e.g., a sensor hub) separate from the processor 2020. In the example that the separate processor (e.g., a sensor hub) is used, while the processor 2020 is in a sleep state, the separate processor may operate without awakening the processor 2020 to control at least a portion of the operation or the state of the sensor module 2076.

According to an embodiment, the interface 2077 may include a high definition multimedia interface (HDMI), a universal serial bus (USB), an optical interface, a recommended standard 232 (RS-232), a D-subminiature (D-sub), a mobile high-definition link (MHL) interface, a SD card/MMC (multi-media card) interface, or an audio interface. A connector 2078 may physically connect the electronic device 2001 and the electronic device 2002. According to an embodiment, the connector 2078 may include, for example, an USB connector, an SD card/MMC connector, or an audio connector (e.g., a headphone connector).

The haptic module 2079 may convert an electrical signal into mechanical stimulation (e.g., vibration or motion) or into electrical stimulation. For example, the haptic module 2079 may apply tactile or kinesthetic stimulation to a user. The haptic module 2079 may include, for example, a motor, a piezoelectric element, or an electric stimulator.

The camera module 2080 may capture, for example, a still image and a moving picture. According to an embodiment, the camera module 2080 may include at least one lens (e.g., a wide-angle lens and a telephoto lens, or a front lens and a rear lens), an image sensor, an image signal processor, or a flash (e.g., a light emitting diode or a xenon lamp).

The power management module 2088, which is to manage the power of the electronic device 2001, may constitute at least a portion of a power management integrated circuit (PMIC).

The battery 2089 may include a primary cell, a secondary cell, or a fuel cell and may be recharged by an external power source to supply power at least one element of the electronic device 2001.

The communication module 2090 may establish a communication channel between the electronic device 2001 and an external device (e.g., the first external electronic device 2002, the second external electronic device 2004, or the server 2008). The communication module 2090 may support wired communication or wireless communication through the established communication channel. According to an embodiment, the communication module 2090 may include a wireless communication module 2092 or a wired communication module 2094. The communication module 2090 may communicate with the external device (e.g., the first external electronic device 2002, the second external electronic device 2004, or the server 2008) through a first network 2098 (e.g. a wireless local area network such as Bluetooth or infrared data association (IrDA)) or a second network 2099 (e.g., a wireless wide area network such as a cellular network) through a relevant module among the wireless communication module 2092 or the wired communication module 2094.

The wireless communication module 2092 may support, for example, cellular communication, local wireless communication, and global navigation satellite system (GNSS) communication. The cellular communication may include, for example, long-term evolution (LTE), LTE Advance (LTE-A), code division multiple access (CMA), wideband CDMA (WCDMA), universal mobile telecommunications system (UMTS), wireless broadband (WiBro), or global system for mobile communications (GSM). The local wireless communication may include wireless fidelity (Wi-Fi), WiFi Direct, light fidelity (Li-Fi), Bluetooth, Bluetooth low energy (BLE), Zigbee, near field communication (NFC), magnetic secure transmission (MST), radio frequency (RF), or a body area network (BAN). The GNSS may include at least one of a global positioning system (GPS), a global navigation satellite system (Glonass), Beidou Navigation Satellite System (Beidou), the European global satellite-based navigation system (Galileo), or the like. In the present disclosure, "GPS" and "GNSS" may be interchangeably used.

According to an embodiment, when the wireless communication module 2092 supports cellar communication, the wireless communication module 2092 may, for example, identify or authenticate the electronic device 2001 within a communication network using the subscriber identification module (e.g., a SIM card) 2096. According to an embodiment, the wireless communication module 2092 may include a communication processor (CP) separate from the processor 2020 (e.g., an application processor (AP)). In this example, the communication processor may perform at least a portion of functions associated with at least one of elements 2010 to 2096 of the electronic device 2001 in substitute for the processor 2020 when the processor 2020 is in an inactive (sleep) state, and together with the processor 2020 when the processor 2020 is in an active state. According to an embodiment, the wireless communication module 2092 may include a plurality of communication modules, each supporting only a relevant communication scheme among cellular communication, local wireless communication, or a GNSS communication.

The wired communication module 2094 may include, for example, include a local area network (LAN) service, a power line communication, or a plain old telephone service (POTS).

For example, the first network 2098 may employ, for example, WiFi direct or Bluetooth for transmitting or receiving commands or data through wireless direct connection between the electronic device 2001 and the first external electronic device 2002. The second network 2099 may include a telecommunication network (e.g., a computer network such as a LAN or a WAN, the Internet or a telephone network) for transmitting or receiving commands or data between the electronic device 2001 and the second electronic device 2004.

According to various embodiments, the commands or the data may be transmitted or received between the electronic device 2001 and the second external electronic device 2004 through the server 2008 connected with the second network 2099. Each of the first and second external electronic devices 2002 and 2004 may be a device of which the type is different from or the same as that of the electronic device 2001. According to various embodiments, all or a part of operations that the electronic device 2001 will perform may be executed by another or a plurality of electronic devices (e.g., the electronic devices 2002 and 2004 or the server 2008). According to an embodiment, in the example that the electronic device 2001 executes any function or service automatically or in response to a request, the electronic device 2001 may not perform the function or the service internally, but may alternatively or additionally transmit requests for at least a part of a function associated with the electronic device 2001 to any other device (e.g., the electronic device 2002 or 2004 or the server 2008). The other electronic device (e.g., the electronic device 2002 or 2004 or the server 2008) may execute the requested function or additional function and may transmit the execution result to the electronic device 2001. The electronic device 2001 may provide the requested function or service using the received result or may additionally process the received result to provide the requested function or service. To this end, for example, cloud computing, distributed computing, or client-server computing may be used.

Although the present disclosure has been described with various embodiments, various changes and modifications may be suggested to one skilled in the art. It is intended that the present disclosure encompass such changes and modifications as fall within the scope of the appended claims.

What is claimed is:

1. An electronic device, comprising:
a housing configured to include a front plate, a rear plate facing a direction opposite to the front plate, and a side member that surrounds a space between the front plate and the rear plate;
a touch screen display configured to be disposed between the front plate and the rear plate;
at least one through-hole configured to, when seen from the front plate, be formed through the front plate between a portion of the side member and the touch screen display;
a speaker module configured to be disposed between the front plate and the rear plate and, when seen from the front plate, include an acoustic generation surface facing the front plate, near the through-hole; and
an internal structure configured to be disposed between the front plate and the acoustic generation surface,
wherein the internal structure and the acoustic generation surface form a space, acoustically connected to the through-hole, together,
wherein the internal structure comprises a surface facing the acoustic generation surface, and
wherein the surface of the internal structure comprises a plurality of areas, each of the plurality of areas includes a different clearance from the acoustic generation surface of the speaker module.

2. The electronic device of claim 1, wherein the acoustic generation surface is substantially flat, and
wherein the plurality of areas comprise:
a first area including a first clearance from the acoustic generation surface; and
a second area including a second clearance greater than the first clearance from the acoustic generation surface.

3. The electronic device of claim 2, wherein the plurality of areas further comprise:
a third area including the second clearance from the acoustic generation surface,
wherein, when seen from the front plate, the first area is disposed between the second area and the third area, and
wherein the first area, second area, and third area are extended substantially parallel to each other in a direction facing the portion of the side member from the touch screen display.

4. The electronic device of claim 3, wherein the second clearance increases in a direction.

5. The electronic device of claim 4, wherein the first area is substantially parallel to the acoustic generation surface.

6. The electronic device of claim 1, wherein, when seen from the front plate, the acoustic generation surface overlaps at least in part with the touch screen display.

7. The electronic device of claim 6, wherein the internal structure is at least in part disposed between the touch screen display and the acoustic generation surface.

8. An electronic device, comprising:
a housing configured to include a front plate disposed to face a first direction, a rear plate facing a second direction opposite to the first direction, and a side member that surrounds a space between the front plate and the rear plate;
a display configured to face the first direction and be disposed between the front plate and the rear plate;
a supporting member configured to be disposed between the display and the rear plate;
a speaker module configured to include an acoustic generation surface, capable of outputting an acoustic signal, facing the first direction; and
a waterproof member configured to be disposed between a portion of the supporting member and the acoustic generation surface,
wherein the front plate comprises a through-hole configured to face the first direction and be acoustically connected with the acoustic generation surface,
wherein the supporting member comprises a speaker module receiving part configured to include a surface facing the speaker module in an area adjacent to the through-hole, the speaker module receiving part in which the speaker module is received; and
wherein the surface of the speaker module receiving part comprises a rib protruded to the acoustic generation surface.

9. The electronic device of claim 8, wherein the rib is extended in a direction perpendicular to a direction where the through-hole is extended.

10. The electronic device of claim 9, wherein the rib gradually increases in width, as distance between the rib and the through-hole increase.

11. The electronic device of claim 8, wherein a surface of the rib is substantially parallel to the acoustic generation surface.

12. The electronic device of claim 8, wherein the rib includes a rounded edge portion that is adjacent to the acoustic generation surface.

13. The electronic device of claim 8, wherein the surface of the speaker module receiving part is closer to the acoustic generation surface as distance between the speaker module receiving part and the through-hole increase.

14. The electronic device of claim 8, wherein the rib is integrally formed of the same material as the speaker module receiving part.

15. An electronic device, comprising:
a housing configured to include a front plate disposed to face a first direction, a rear plate facing a direction opposite to the first direction, and a side member that surrounds a space between the front plate and the rear plate;

a display configured to face the first direction and be disposed between the front plate and the rear plate;

a supporting member configured to be disposed between the display and the rear plate;

a speaker module configured to include an acoustic generation surface, capable of outputting an acoustic signal, facing the first direction; and a waterproof member configured to be disposed between a portion of the supporting member and the acoustic generation surface, wherein the front plate comprises a through-hole configured to face the first direction and be acoustically connected with the acoustic generation surface, wherein the supporting member comprises a speaker module receiving part configured to include a surface facing the speaker module in an area adjacent to the through-hole, the speaker module is received in the speaker module receiving part; and wherein the surface of the speaker module receiving part comprises a plurality of areas, each of the plurality of areas includes a different clearance from the acoustic generation surface.

16. The electronic device of claim 15, wherein the plurality of areas comprise:

a first area including a first clearance from the acoustic generation surface; and a second area including a second clearance greater than the first clearance from the acoustic generation surface.

17. The electronic device of claim 16, wherein the first area is an area corresponding to the center of the acoustic generation surface.

18. The electronic device of claim 16, wherein the first area is substantially parallel to the acoustic generation surface.

19. The electronic device of claim 16, wherein, the second area is closer to the acoustic generation surface as distance between the second area and the through-hole increase.

20. The electronic device of claim 16, wherein the second area receives liquid material introduced through the through-hole.

* * * * *